UNITED STATES PATENT OFFICE.

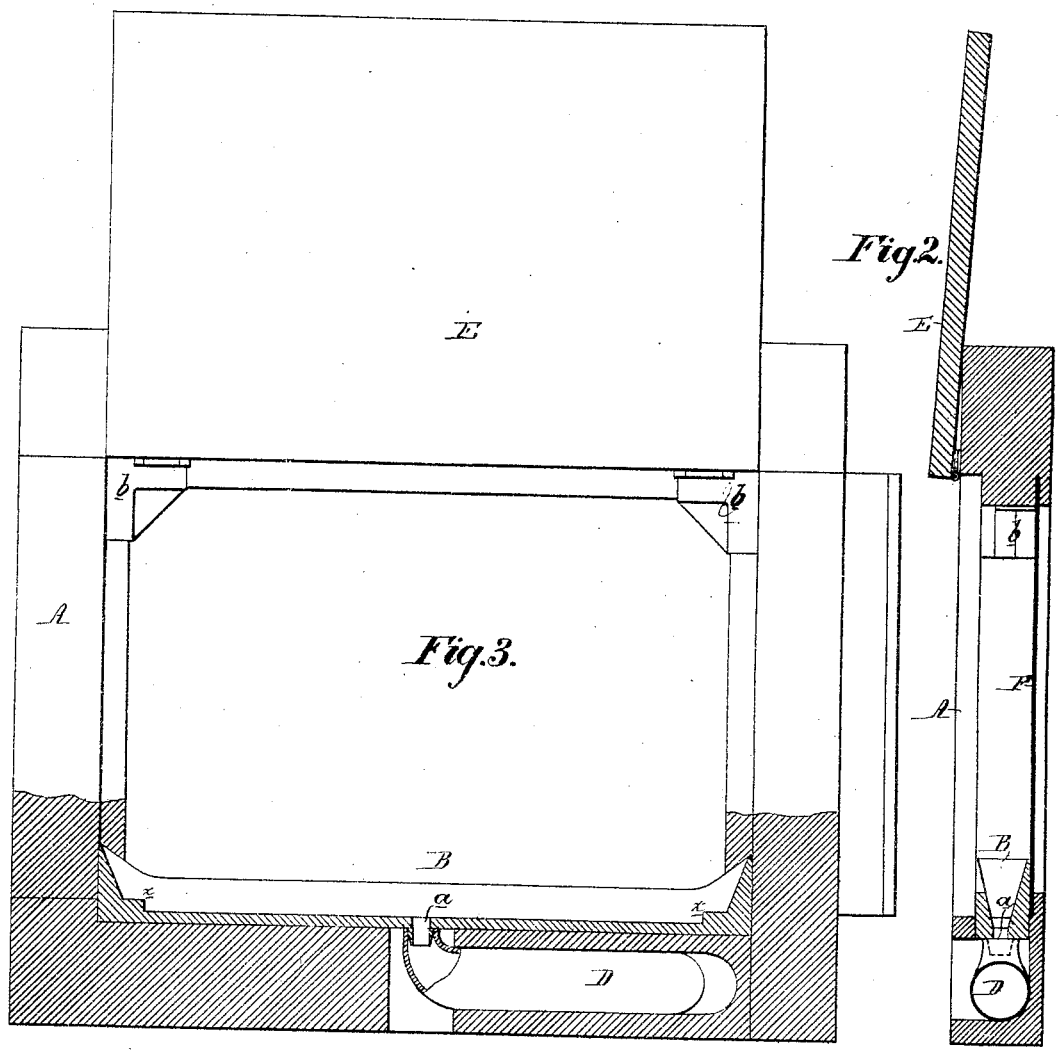

RALPH F. CHANNELL AND ADOLPHUS BONZANO, OF PHŒNIXVILLE, PA.

IMPROVEMENT IN PHOTOGRAPHIC-PLATE HOLDERS.

Specification forming part of Letters Patent No. 132,250, dated October 15, 1872.

*To all whom it may concern:*

Be it known that I, RALPH F. CHANNELL and ADOLPHUS BONZANO, of Phœnixville, Chester county, Pennsylvania, have invented an Improvement in Photographic Plate, of which the following is a specification:

The object of our invention is twofold: First, to save the chemicals employed in connection with photographic negatives; and, second, to prevent the rapid destruction of the wooden frames by the action of the chemicals.

We attain both these objects by placing within the usual plate-holder A, illustrated in the accompanying drawing, a trough, B, of glass, earthenware, or other like material, for receiving the lower edge of the glass negative, the trough having a central tubular projection, $a$, entering the mouth of a detachable glass reservoir, D, which has been heretofore used in connection with photographic frames. The chemicals, as they drip from the negative, are received by the trough and directed into the reservoir D, which can be withdrawn from the frame from time to time and emptied of its contents. The frame is of the ordinary construction, having the usual flap E, dark side F, and recessed corner pieces $b\ b$ for receiving the two upper corners of the glass negative; the usual lower corner pieces are, however, discarded to make way for the above-mentioned trough B, near the ends of which projections or ledges $x$ are arranged to receive the lower corners of the negative, from which the chemicals drip into the trough, so that they are entirely free from contact with the wood, the latter being protected by the trough from their deteriorating action.

We claim as our invention—

1. The combination, with the frame and reservoir, of the trough B, arranged to serve as a rest for the plate, and communicating with the reservoir, substantially as described.

2. The trough B adapted to the frame, and having ledges $x$ at the ends, for the purpose set forth.

In testimony whereof we have signed our names to this specification in the presence of two subscribing witnesses.

RALPH F. CHANNELL.
ADOLPHUS BONZANO.

Witnesses:
   P. G. CAREY,
   JEROME JOHN.